(12) United States Patent
Wakui

(10) Patent No.: US 7,848,530 B2
(45) Date of Patent: Dec. 7, 2010

(54) ELECTRONIC DEVICE AND ITS CONTROL METHOD

(75) Inventor: Tetsuya Wakui, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 1348 days.

(21) Appl. No.: 11/341,662

(22) Filed: Jan. 30, 2006

(65) Prior Publication Data

US 2006/0176546 A1    Aug. 10, 2006

(30) Foreign Application Priority Data

Feb. 4, 2005    (JP)    ............................. 2005-029826

(51) Int. Cl.
*H04B 15/00*    (2006.01)
*G11B 27/36*    (2006.01)
(52) U.S. Cl. ........................ 381/94.1; 360/31
(58) Field of Classification Search .................. 700/94; 381/94.1, 94.2, 94.5, 94.8, 67; 360/31; 359/337.2
See application file for complete search history.

(56) References Cited

FOREIGN PATENT DOCUMENTS

JP    07-177596    7/1995
JP    11-205891  *  7/1999

OTHER PUBLICATIONS

Translation of JP 11205891, Hanada, Jul. 30, 1999.*

* cited by examiner

*Primary Examiner*—Ping Lee
(74) *Attorney, Agent, or Firm*—Fitzpatrick, Cella, Harper & Scinto

(57) ABSTRACT

According to this invention, mechanical noise from a noise source of a pre-identified device can be removed, while tracing a change in gain of acoustic wave data, and noise is removed by tracing a change over time of the noise source. To this end, the gain of a signal from a microphone is automatically adjusted by an Auto level control unit (ALC). A threshold according to the gain of the ALC is stored in a register. A comparator compares audio data from the ALC with the threshold, generates weighting coefficients k and 1−k based on the comparison result, and outputs them to weighting coefficient multipliers. The weighting coefficient multipliers and an adder calculate a weighted average value of data in a memory that stores weighting coefficients of old frames and the input acoustic wave data, and update the contents of the memory by the calculation result. With this update processing, the memory stores only a NOISE component. A level adjusting unit adjusts data read out from the memory according to the current gain of the ALC. An adder subtracts the adjusted data from the input acoustic wave data, and outputs data after noise removal.

8 Claims, 16 Drawing Sheets

F I G. 5
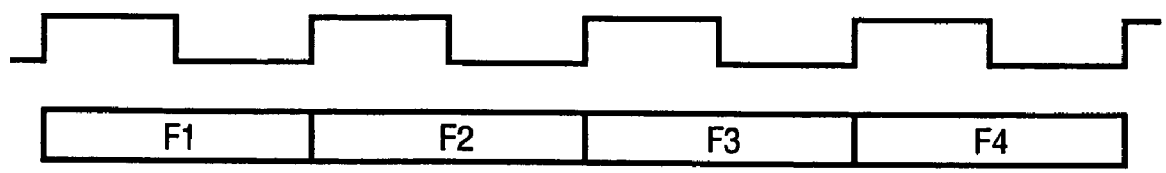

ELECTRONIC DEVICE AND ITS CONTROL METHOD

FIELD OF THE INVENTION

The present invention relates to a technique for processing acoustic wave data gathered by an acoustic wave gathering unit such as a microphone or the like.

BACKGROUND OF THE INVENTION

As an apparatus of this type, for example, a camera-integrated video camera is known. Such apparatus uses a magnetic tape as a recording medium, and adopts a helical scan mechanism using a rotary drum in order to increase the recording density on that recording medium.

However, this mechanism produces noise called head rattle when the magnetic tape and rotary recording head come into contact with each other and separate from each other. Since energization to coils of a magnetic motor is switched to drive the rotary drum, its electromagnetic noise is also produced.

Such noise components mix in a built-in microphone, and are recorded together with an audio signal to be originally recorded, causing noisy audio output. To solve such problem, a noise reduction technique for checking a noise spectrum mixing in the microphone in advance, and subtracting components in that frequency band in correspondence with the noise level is known (e.g., Japanese Patent Laid-Open No. 7-177596).

According to this proposal, means for extracting noise spectrum components is provided and control is made to measure the noise level while cutting off an audio signal to be originally recorded, and to make the audio signal have the same level as that of mixing noise, thus reducing the noise by the level of the spectrum, and eliminating the influence on an audio signal when the audio signal is input.

However, with such conventional method, noise components must be checked in advance, and means for extracting noise, e.g., bandpass filters must be prepared as many as the number of noise spectrum components. As an alternative measure, frequencies of closer spectrum components are extracted together, thus reducing the number of bandpass filters. For example, if there are two noise spectrum frequencies, i.e., 1 kHz and 2 kHz, when the center frequency is set at 1.5 kHz and the frequency bandwidth is set to 1 kHz, 1 kHz and 2 kHz of noise components can be extracted. However, in this case, if 1 kHz and 2 kHz have different levels, the average value of these two levels must be calculated or one level must be adjusted to the other. Hence, a subtractive signal of the same level as those of noise components cannot be obtained, and the removal effect is reduced. Furthermore, when an audio signal to be recorded includes a 1.5 kHz component, that component is also attenuated, thus influencing the sound quality. When the level changes due to a change over time, the level to cancel must be re-adjusted. On the other hand, when noise spectrum components change, it becomes difficult to respond to such changes.

SUMMARY OF THE INVENTION

It is an object of the present invention to provide a technique which can remove mechanical noise from a noise source of a pre-identified device while tracing a change in gain of acoustic wave data and can trace a change over time in the noise source.

In order to achieve the above object, an electronic device of the present invention comprises the following arrangement.

That is, there is provided an electronic device having a noise source which produces periodic noise, and acoustic wave gathering means for gathering a sonic wave by converting the sonic wave into electrical acoustic wave data, comprising:

ALC means for automatically adjusting the level of acoustic wave data gathered by the acoustic wave gathering means;

storage means which can store acoustic wave data for at least one cycle of noise produced by the noise source;

update means for updating the storage means by multiplying acoustic wave data of interest obtained by the ALC means by a first weighting coefficient value, multiplying the acoustic wave data of interest by in-phase data in the storage means and a second weighting coefficient, and adding the two products;

adjusting means for adjusting data read out from the storage means in accordance with a gain of the ALC means; and subtraction means for subtracting the data adjusted by the adjusting means from the acoustic wave data of interest, and outputting the difference as acoustic wave data after noise removal.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows a data sequence in the first embodiment;

DETAILED DESCRIPTION OF THE PREFERRED EMBODIMENTS

Preferred embodiments according to the present invention will be described in detail hereinafter with reference to the accompanying drawings.

Figure 1:
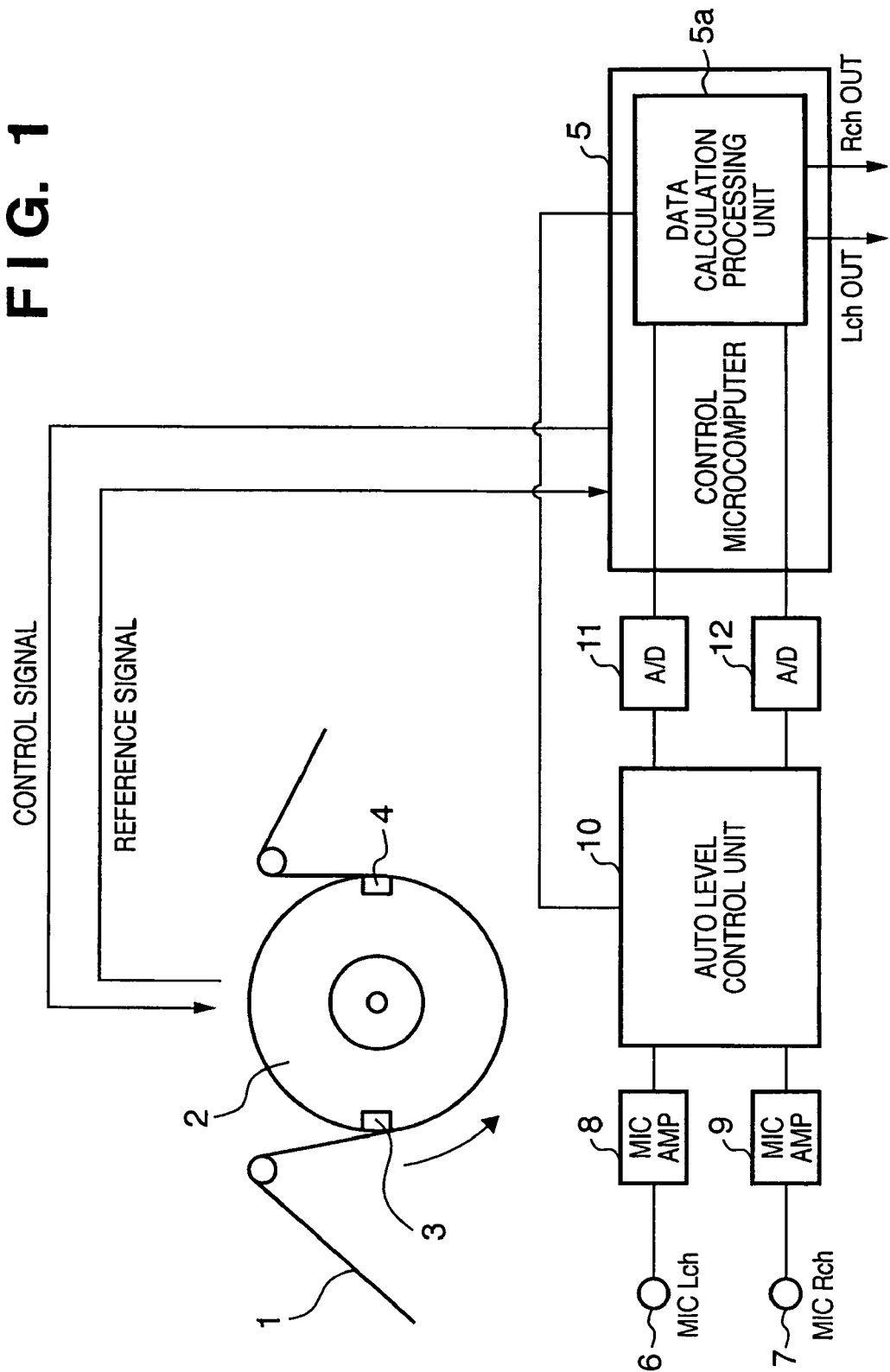
FIG. 1 is a block diagram showing the arrangement according to the first embodiment of the present invention.

FIG. 1 is a block diagram showing a principal arrangement of an audio recording/playback section (helical scan type recording/playback section) in a digital video camera apparatus to which an embodiment of the present invention is applied. This apparatus comprises a CCD image sensing device, a focusing lens, and an optical unit (image sensing unit) for driving the lens. However, drive control in this optical unit is known to those who are skilled in the art, and is not directly related to the present invention, thus omitting a description about its arrangement.

In FIG. 1, reference numeral 1 denotes a magnetic tape as a recording medium (a magnetic tape cassette is not shown); 2, a rotary drum; 3 and 4, magnetic heads which are attached to the rotary drum and are used to record audio and video data; 5, a control microcomputer having a data calculation processing unit 5a (to be described in detail later); 6 and 7, microphones for L and R channels; 8 and 9, microphone amplifiers; and 10, an audio level control (ALC) unit. Reference numerals 11 and 12 denote A/D converters which output 16-bit data with a positive/negative sign according to a predetermined sampling frequency.

In this arrangement, acoustic wave signals which are converted into electrical signals by the microphones 6 and 7 are respectively amplified by the microphone amplifiers 8 and 9, and are then amplified to appropriate levels by the ALC unit 10. The amplified electrical signals are converted into digital data by the A/D converters 11 and 12. The digital acoustic wave data are finally recorded on the magnetic tape.

Figure 8:
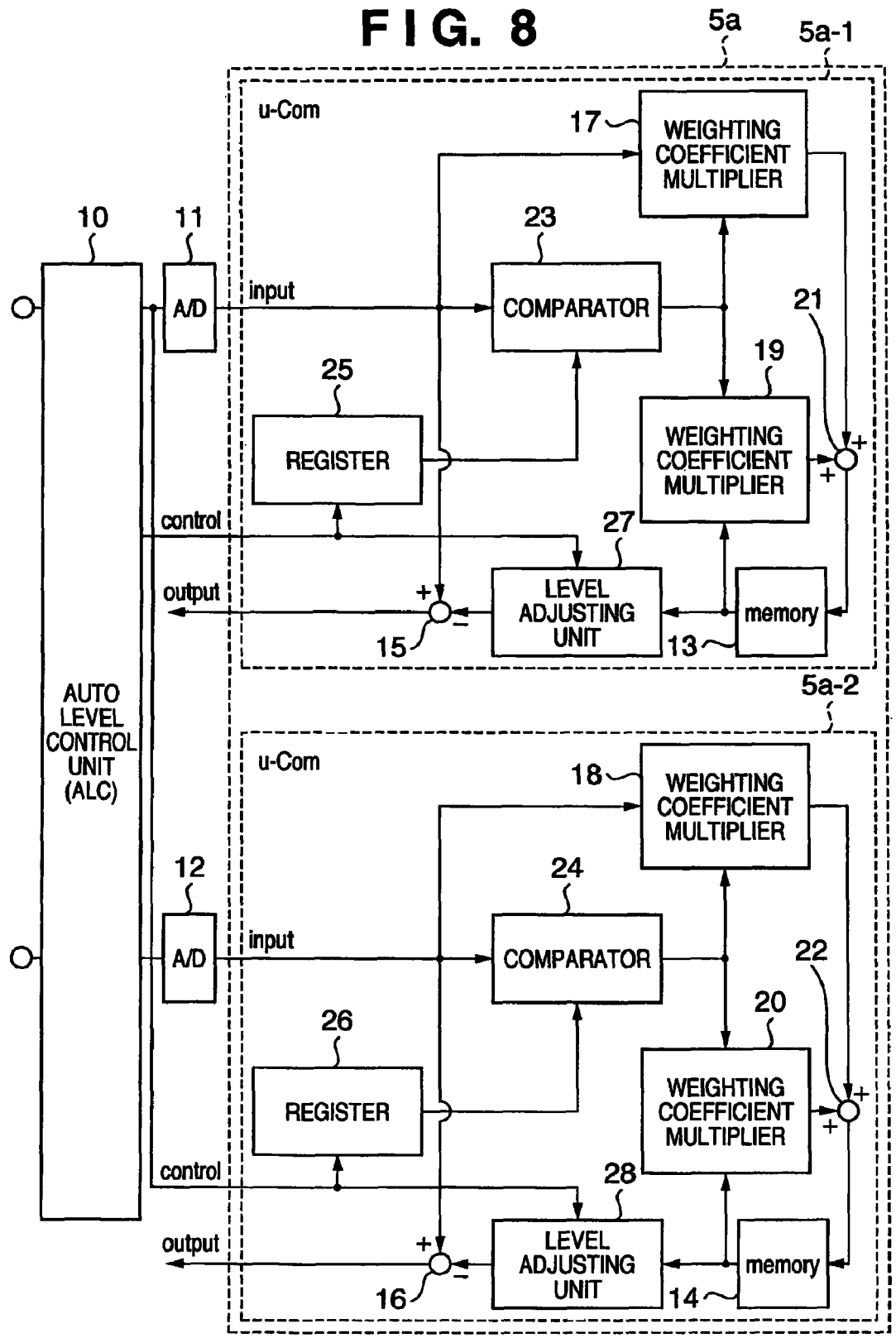
FIG. 8 is a block diagram showing the arrangement of a data calculation processing unit in the first embodiment.

The data calculation processing unit 5a of this embodiment has independent circuit arrangements 5a-1 and 5a-2 for the L and R channels, as shown in FIG. 8.

Referring to FIG. 8, reference numerals 13 and 14 denote memories; 15, 16, 21, and 22, adders; 17, 18, 19, and 20; weighting coefficient multipliers; 23 and 24, comparators; and 25 and 26, registers for storing a threshold. Since the L- and R-channel circuit arrangements are the same, the L-channel circuit 5a-1 and its operation will be described below.

On the magnetic tape 1, a recording signal is recorded by helical scans of the magnetic heads 3 and 4, which are attached to the rotary drum 2 that undergoes rotation control of the microcomputer 5 so as to have a 180° positional relationship. The rotary drum 2 outputs a reference signal indicating the phase of rotation, i.e., head switching pulses, to the control microcomputer 5 to inform it of the contact states of the magnetic heads 3 and 4 and the magnetic tape 1. The control microcomputer 5 controls the outputs of recording signals to the magnetic heads 3 and 4 according to this timing. At this time, when the magnetic heads 3 and 4 contact or are separated from the magnetic tape 1 which is wound around the rotary drum 2, noise (mechanical vibration) is produced, and enters the microphones 6 and 7 and mixes into the aforementioned acoustic wave signal.

Figure 2:
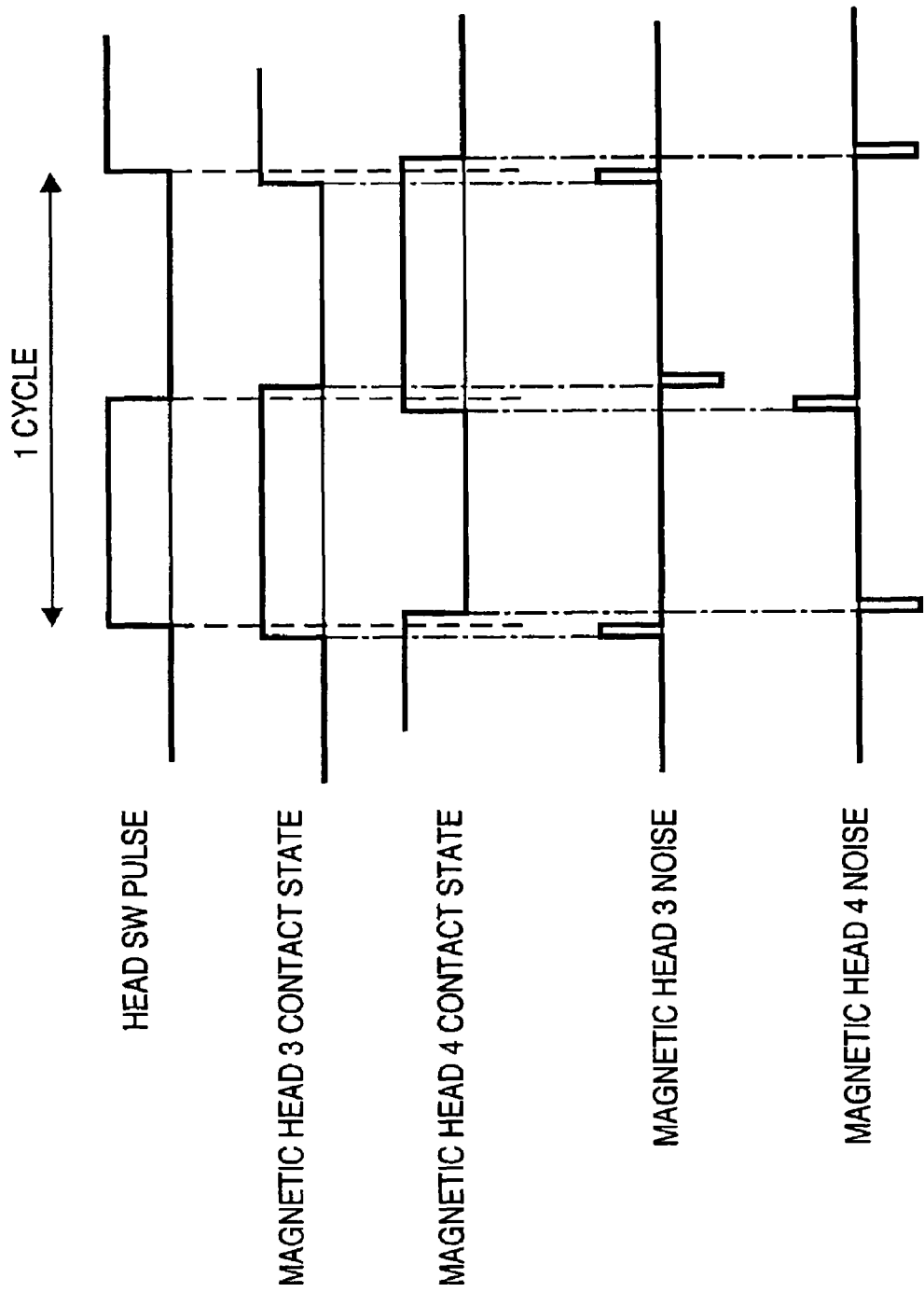
FIG. 2 is a chart showing the noise generation timings based on rotation of a rotary drum and the contact states of magnetic heads and a magnetic tape.

FIG. 2 shows the time relationship among the aforementioned reference signal, contact timings of the magnetic heads 3 and 4 and the magnetic tape 1, and noise generation.

Referring to FIG. 2, when the head switching pulse is at High level, a recording signal is applied to the magnetic head 3; when the head switching pulse is at Low level, a recording signal is applied to the magnetic head 4. One cycle of the head switching pulse represents one revolution of the rotary drum 2. Since each magnetic head must contact the magnetic tape 1 and must become a stable state before it receives the recording signal, the magnetic head contacts the magnetic tape slightly before switching of recording signals, and maintains a contact state during a minute period even after application of the recording signal. "Magnetic head 3 contact state" and "magnetic head 4 contact state" in FIG. 2 represent such state: High level represents a contact state, and Low level represents a non-contact state. The timings of noise components produced at that time are shown below these charts.

Figure 3:
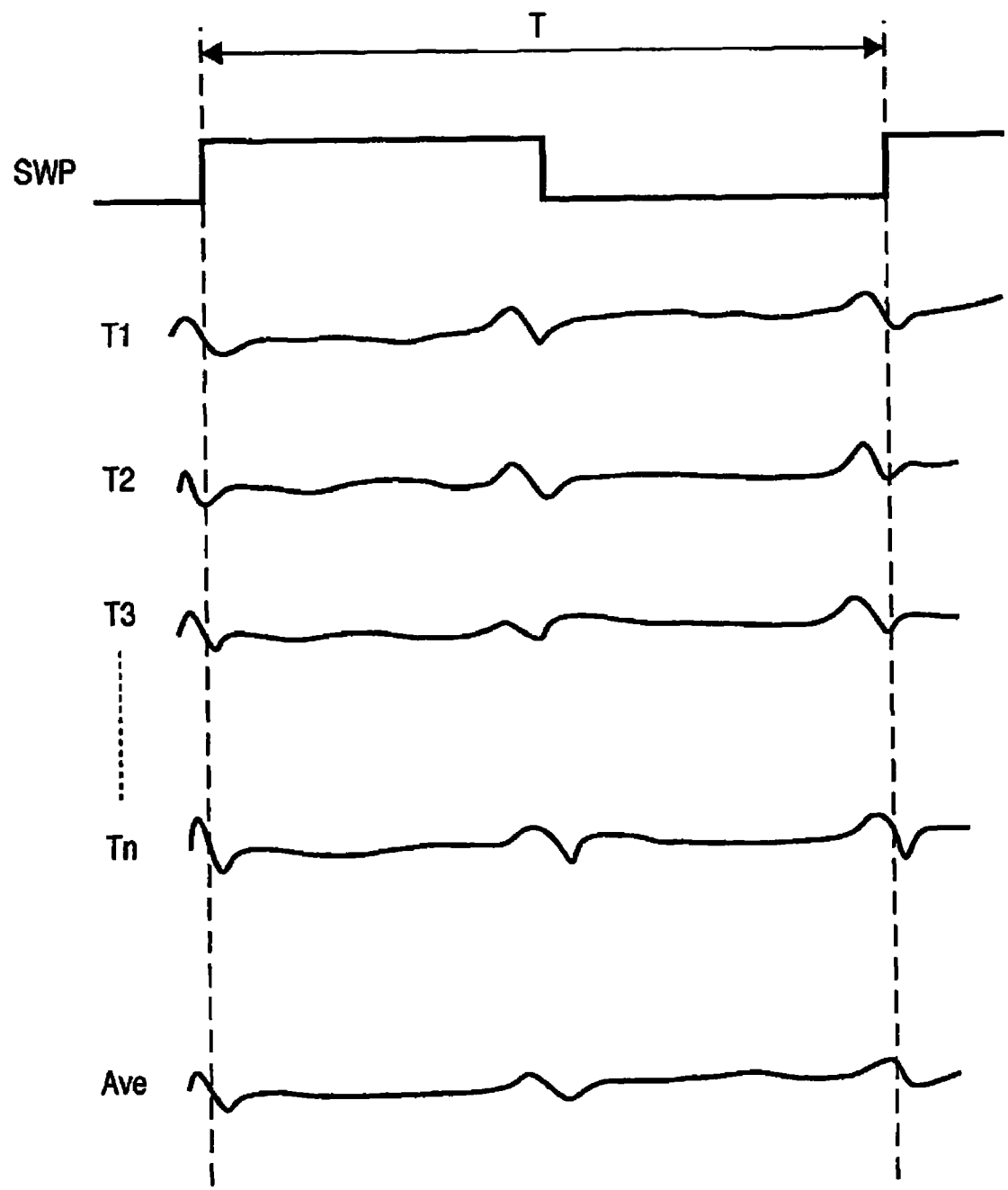
FIG. 3 is a chart showing the waveforms of periodic noise components in the first embodiment.

Furthermore, FIG. 3 shows such phenomenon as noise waveforms. With respect to a time period T of one cycle of the head switching pulse shown as the uppermost waveform in FIG. 3, a waveform for a continuous time period is divided into time periods for one cycle like T1, T2, T3, ..., Tn, and these waveforms are shown juxtaposed with each other. As can be seen from FIG. 3, substantially the same noise components are produced per revolution. This is because the relationship between the operations of the rotary head and magnetic tape has nearly no change elements. A waveform Ave obtained by averaging these waveforms is shown as the lowermost waveform.

Figure 4:
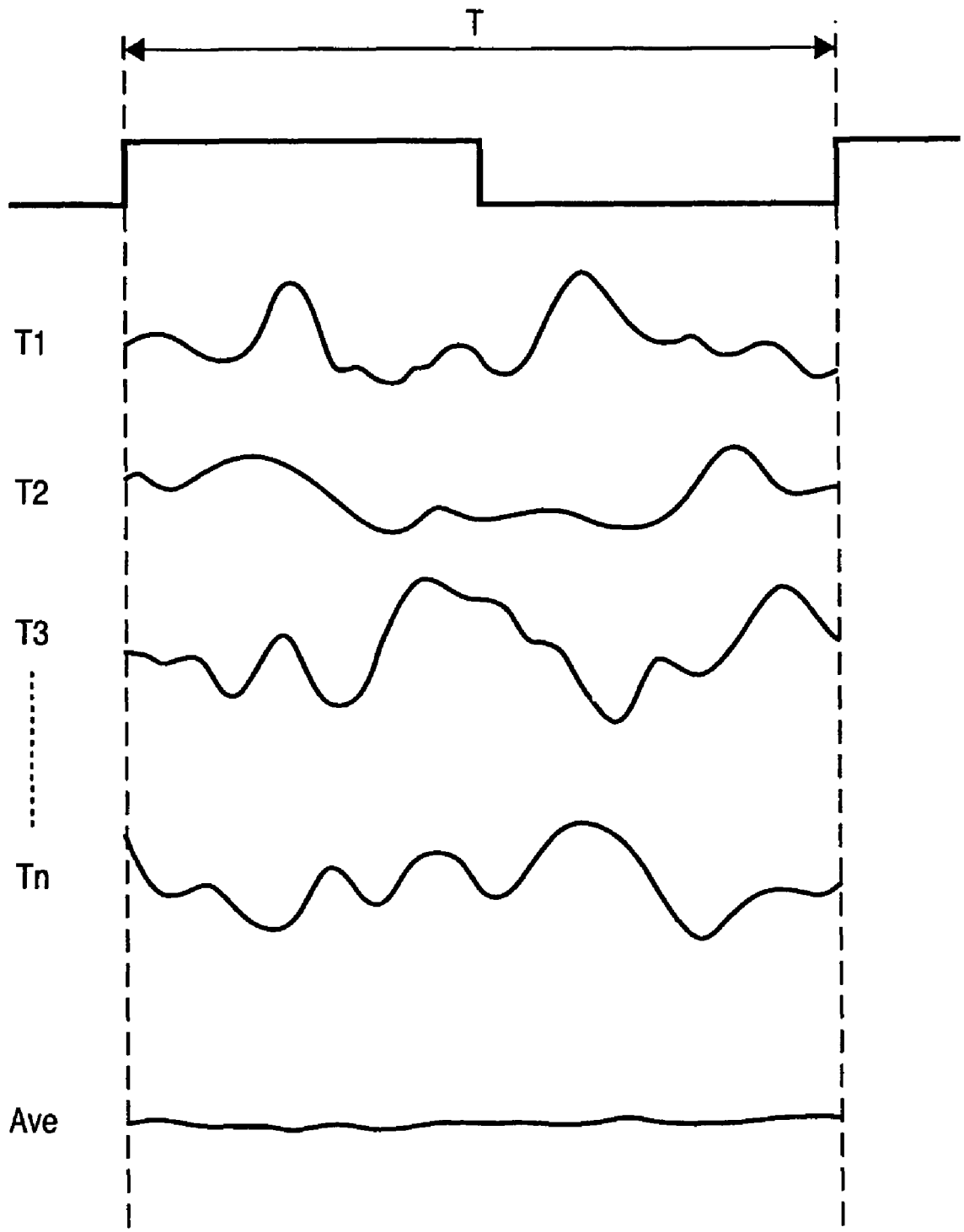
FIG. 4 is a chart showing asynchronous audio waveforms in the first embodiment.

On the other hand, FIG. 4 shows the state of an audio signal input to the microphones 6 and 7 during the time period T of one cycle of the head switching pulse. That is, a continuous audio waveform is divided into time periods for one cycle like T1, T2, ..., Tn, and the divided waveforms are shown juxtaposed with each other. Since these changes in audio signal for one cycle have no relation to the head switching pulse, the probability of synchronization of these waveforms is small. Therefore, when the number of times of average calculation increases, the average value infinitely approaches zero.

Therefore, when audio data is stored and held for an appropriate period, and in-phase data in the time period T of one cycle of the head switching pulse are added, only noise components shown in FIG. 3 remain. This embodiment exploits the difference between the characteristics shown in FIGS. 3 and 4.

Figure 6:
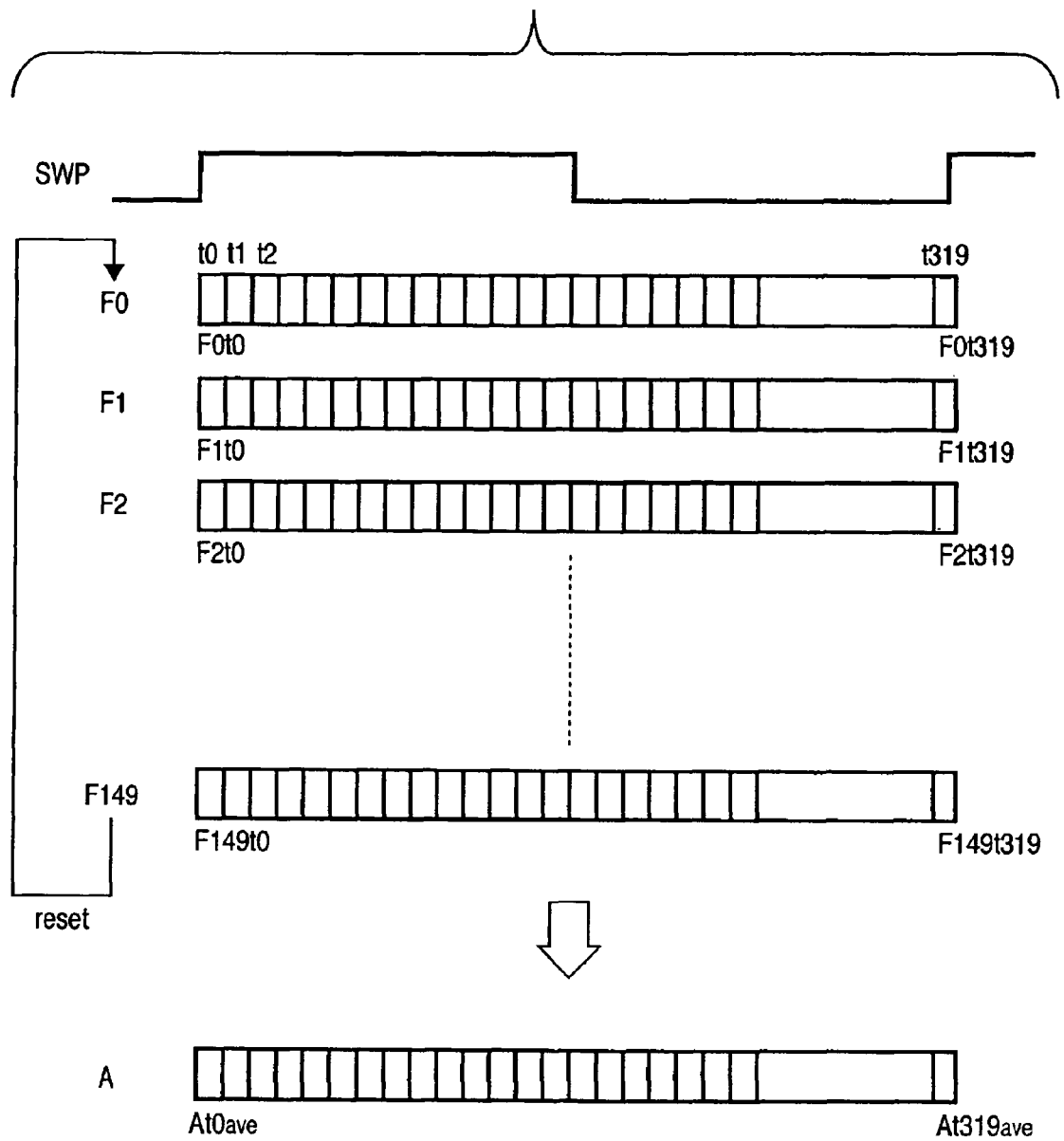
FIG. 6 is a view for explaining the processing of a data sequence in the first embodiment.

Note that data sampled during one cycle T of the head switching pulse is called a frame. That is, the data T1, T2, T3 .... can be represented by frames F1, F2, F3, ... in FIG. 5. In order to obtain an average value Ave, a memory for storing sampling data of respective frames need only be prepared, as shown in FIG. 6. That is, when the average value of 150 frames is to be calculated, a memory for the 150 frames is required.

If the time period T that requires the rotary drum 2 to complete one revolution is 1/150 sec, and the sampling frequency of the microphone 6 is 48 kHz, one frame includes 48000/150=320 data. Let tm (m=0, 1, ..., 319) be each sampling data in frame Fn. Then, an average value Ave(tm) of in-phase data tm of respective frames can be calculated by:

$$\mathrm{Ave}(tm) = \Sigma Fn(tm)/150$$

In this way, Ave(0) to Ave(319) at respective phase positions can be calculated.

When the average values are calculated, as described above, if each sample data is 16 bits, the memory 13 must have a capacity of 16×320×150/8=9600 bytes, and calculating the average values requires a nonnegligible time period. In this embodiment, by providing the weighting coefficient multipliers 17 and 19, as shown in FIG. 8, the memory 13 calculates the average values using the memory capacity (=320×16/8=640 bytes) for one frame.

The extraction operation of the aforementioned average values Ave will be explained first as the operation of this embodiment.

The outputs from the A/D converters 11 and 12 are input the average value calculation unit (or data calculation processing unit) 5a.

The operation of the average value calculation unit 5a will be described below using FIG. 8. In FIG. 8, since the operations for the left and right channels are the same, the operation of only one channel will be explained. Data from the A/D converter 11 is input to the average value calculation unit 5a at the cycle of sampling clocks, and is then input to the comparator 23. The level of this input is determined by the gain control state of the ALC unit 10 described above, and the gain control information is supplied to the register 25 to control it to output a threshold determined in conjunction with the gain control state. The comparator 23 compares the threshold from the register 25 with the input data, and outputs a comparison result to the weighting coefficient multipliers 17 and 19. Let k ($0 \leq k \leq 1$) be the weighting value to be multiplied by the weighting coefficient multiplier 17. Then, the following relational expressions are given:

Weighting coefficient to be multiplied by weighting coefficient multiplier 17=k Weighting coefficient to be multiplied by weighting coefficient multiplier 19=1−k The weighting coefficient multiplier 17 multiplies the input data from the A/D converter 11 by the weighting coefficient k, and outputs the product to the adder 21.

On the other hand, the weighting coefficient multiplier 19 multiplies the data from the memory 13 by the determined weighting coefficient "1−k", and outputs the product to the adder 21. At the same time, the input data from the A/D converter 11 and data output from a level adjusting unit 27 are added by the adder 15, thus outputting final acoustic wave data.

The level adjusting unit 27 determines an adjusting value (gain) of the data from the memory 13 in conjunction with the gain control state of the ALC unit 10.

Let G1 be the gain of the ALC unit 10 and G2 be the gain of the level adjusting unit 27. Then, these gains have the relation given by:

$$G1=1/G2$$

The adder 15 subtracts the data from the level adjusting unit 27 from the input data from the A/D converter 11.

This memory 13 is a FIFO memory which can store 320 sampling data of an audio signal for one cycle of the head switching pulse (more specifically, the cycle of the head switching pulse is 1/150 sec, and the sampling frequency is 48 kHz). The aforementioned circuits, i.e., the adders 15 and 21, comparator 23, and memory 13 operate in synchronism with the sampling frequency (48 kHz in this embodiment).

Next, the noise reduction operation will be described below. Since the processes for respective channels are the same, that for one channel will also be described below.

Let FmIntn be data from the A/D converter 11 at an arbitrary sampling time tn (n: an integer) and arbitrary frame time Fm (m: an integer), and Mtn be the output data of the memory 13. Since the memory 13 can stores 320 data (data for one cycle of the drum), data output from the memory 13 is that just 1/150 sec ahead of data from the A/D converter 11 at that time (i.e., in-phase data one frame before). Therefore, the adder 21 outputs:

$$FmIntn*k+F(m-1)*(1-k)$$

and the output data is stored in the memory 13. This means that an average value Atn of noise is stored.

Let FmOUTtn be the output from the adder 15. Then, FmOUTtn can be calculated by:

$$FmOUTtn=FmIntn-F(m-1)Mtn*G2$$

Since $$Mtn=Atn$$

the average value Atn of noise is subtracted from a time tn (n: an integer) from an arbitrary switching pulse of an arbitrary cycle Fm (m: an integer) of the input signal, and removal of noise produced by rotation of the drum can succeed.

Figure 7:
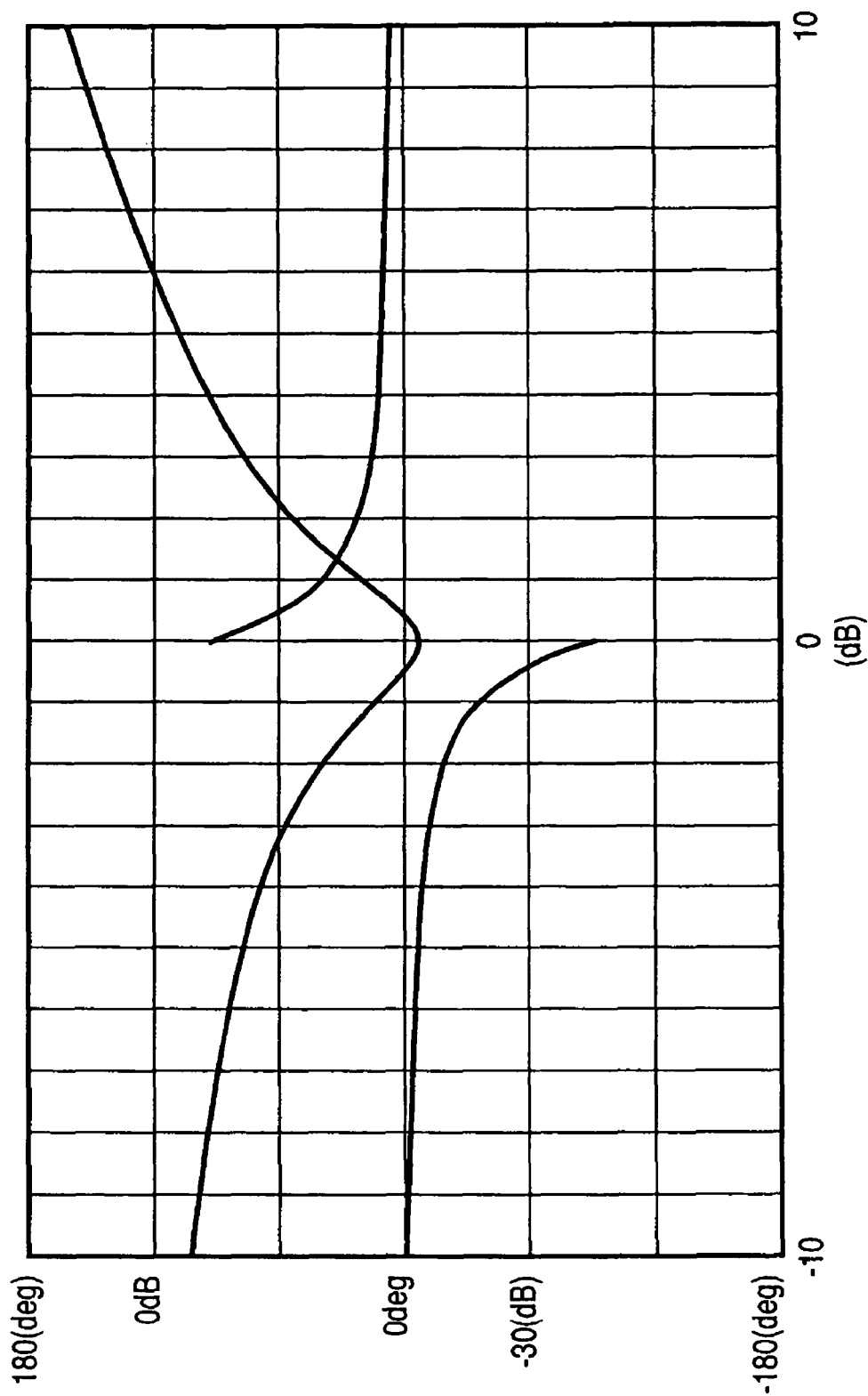
FIG. 7 is a graph showing the reduction amount of noise in the first embodiment.

The noise attenuation amount at that time is determined depending on the rotation precision of the rotary drum 2 and the change width of the produced noise level. Assume that the precision in which rotation nonuniformity changes phase within the range of 5° at the highest frequency of a noise component to be reduced is set with respect to that highest frequency, and the change width is 2 dB with respect to the aforementioned average value. FIG. 7 shows the attenuation amount when two signals having different phases and levels are subtracted. Under the aforementioned conditions, since the noise level is attenuated 15 dB or more from FIG. 7, a sufficient effect can be obtained.

Figure 10:
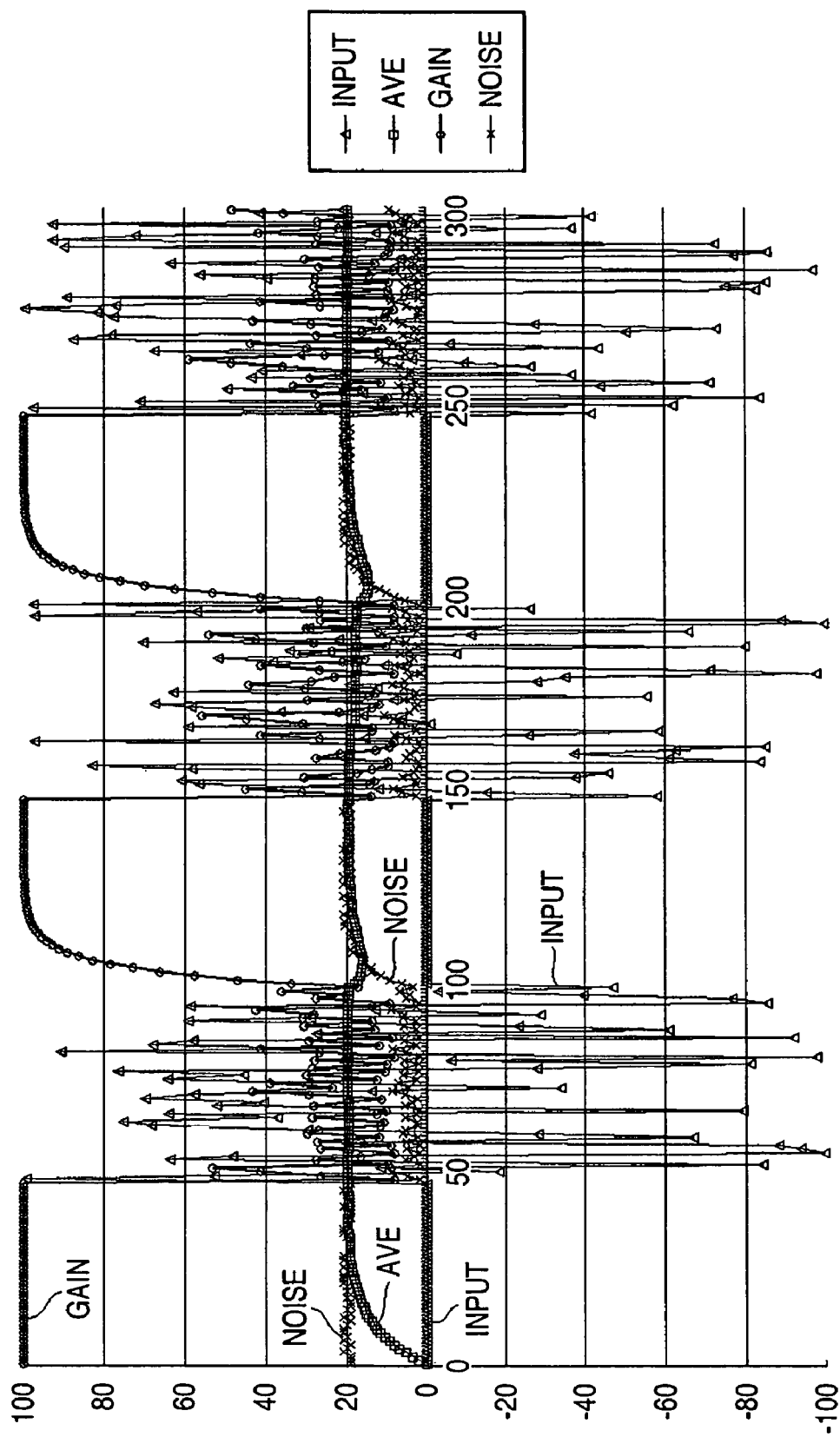
FIG. 10 shows a simulation result to explain the processing in the first embodiment.

FIG. 10 shows an example of simulation when INPUT is the input data from the A/D converter 11, NOISE is noise, AVE is the value of the memory 13, and GAIN is the gain of the ALC unit 10. In FIG. 10, the abscissa plots the number of frames, and the ordinate plots the data value.

In this example, noise data at in-phase times in a frame are varied within a small width at arbitrary sampling times. More specifically, noise data values ranging from 19 to 21 are randomly set for each frame, and a microphone input signal is set to zero in frames 0 to 50, 151 to 200, and 251 to 300. In frames 51 to 100, 101 to 150, and 201 to 250, the ALC is enabled to have a random value of MICINPUT LEVEL=±500 as the microphone input signal level.

The maximum value of the ALC unit 10 is "1", which is illustrated in FIG. 10 at a 100× scale.

The register 25 generates two threshold values according to the gain values of the ALC unit 10, and outputs them to the comparator 23.

In this embodiment, when the gain of the ALC unit 10 is "1" as a maximum value, a threshold thresh is given by:

$$thresh=20 \pm 10$$

That is, the register 25 outputs "10" as a lower-limit threshold (Tmin) and "30" as an upper-limit threshold (Tmax) to the comparator 23.

When data INPUT from the A/D converter 11, the lower limit value, and the upper limit value satisfy:

$$Tmin \leq \text{absolute value of INPUT} \leq Tmax \quad (1)$$

the comparator determines the weighting coefficient k as:

$$k=0.1$$

The comparator outputs the determined "k" to the weighting coefficient multiplier 17, and outputs "1−k" to the weighting coefficient multiplier 19 to calculate products.

If condition (1) above is not satisfied, the comparator determines k as:

$$k=0.001$$

The comparator then outputs k to the weighting coefficient multiplier 17, and outputs "1−k" to the weighting coefficient multiplier 19.

As can be seen from FIG. 10, noise extraction is done while the gain of the ALC unit 10 assumes a maximum value from the start until the 50th frame. After a given time period (40th frame) has elapsed, the average value AVE becomes stable and equal to the noise level. Since one frame is 1/150 sec, noise data is stored in the memory 13 for 40/150=about 0.26 sec.

From the 51st frame, a random value of ±500 is input as the microphone input signal, and the gain of the ALC unit 10 changes accordingly. When the gain becomes half the maximum value, thresholds generated by the register 25 are determined by:

Thresh=(20±10)×0.5

That is, the lower-limit threshold Tmin=5 and upper-limit threshold=15 are output to the comparator 23.

When the input data INPUT satisfies the aforementioned condition (1), the comparator 23 determines the weighting coefficient k=0.1; otherwise, it determines k=0.001. In a situation of the weighting coefficient k=0.001, the average value AVE becomes harder to change than k=0.1, and the contents of the memory 13 can be kept while reducing any changes.

The gain of the ALC unit 10 will be examined below. A decrease in gain of the ALC unit 10 means that NOISE included in the input data INPUT is reduced accordingly. It may be considered that the memory 13 stores noise data when the gain of the ALC unit 10 is "1" as a maximum value. Therefore, data from the memory 13 must be adjusted depending on the gain value of the ALC unit 10 when data INPUT is input from the A/D converter 11. This adjustment is done by the level adjusting unit 27.

More specifically, when the gain of the ALC unit 10 is halved, as described above, the level adjusting unit 27 halves the data from the memory 13.

In the example of FIG. 10, when the gain of the ALC unit 10 is "1" as a maximum value, NOISE is randomly generated within the range from 19 to 21. Hence, the level adjusting unit 27 halves the data from the memory 13 and outputs a value ranging from 9.5 to 10.5 as its adjustment result.

More specifically, when the gain of the ALC unit 10 is "1", the memory 13 has a state wherein its storage data AVE is approximate to NOISE. In the example of FIG. 10, it is considered that data stored in the memory 13 assumes a value around 20. Since the adjustment value G2 of the level adjusting unit 27 is 0.5, positive data ranging from 9.5 to 10.5 is input as a signal input to the adder 15, and is added to the input data INPUT as a negative value, thus successfully removing noise from the input data INPUT.

In order to obtain an evaluation amount of data to be output from the adder 15, a noise amount error mixing in the data output from the adder 15 is expressed by:

$$\text{error} = \text{NOISE} \times G1 - \text{AVE} \times G1 \quad (2)$$

When the gain of the ALC unit 10 is "1" as a maximum value, we have:

error=NOISE−AVE

When data stored in the memory 13 becomes approximately the same as NOISE, error≈0. Hence, this means that the noise amount error included in the data output from the adder 15 becomes substantially zero.

Figure 11:
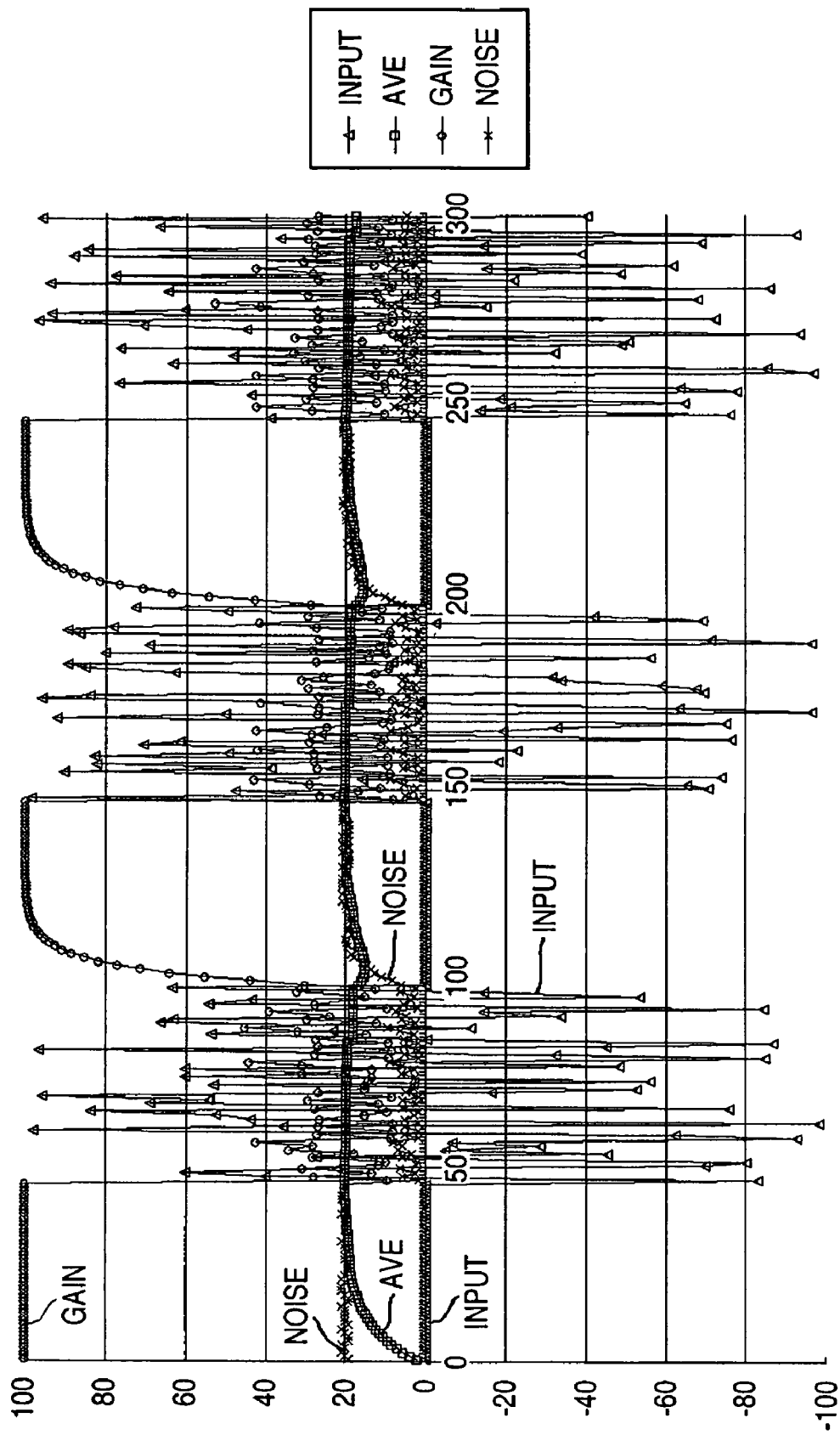
FIG. 11 shows a simulation result to explain the processing in the first embodiment.

Assume that no level adjusting unit 27 is provided. FIG. 11 shows a simulation result in such case.

As shown in FIG. 11, the memory 13 successfully stores a value "20" until frame 50 as a silent state. However, after frame 51, the gain of the ALC unit 10 is reduced, and the noise value to be subtracted should be reduced accordingly. However, the maximum value "20" is subtracted, and normal noise removal cannot be done.

This is because an arithmetic operation given by:

error=NOISE×G1−AVE is done in place of equation (2).

Another problem is the noise removal ratio in a process in which the gain of the ALC unit 10 is returned.

Figure 12:
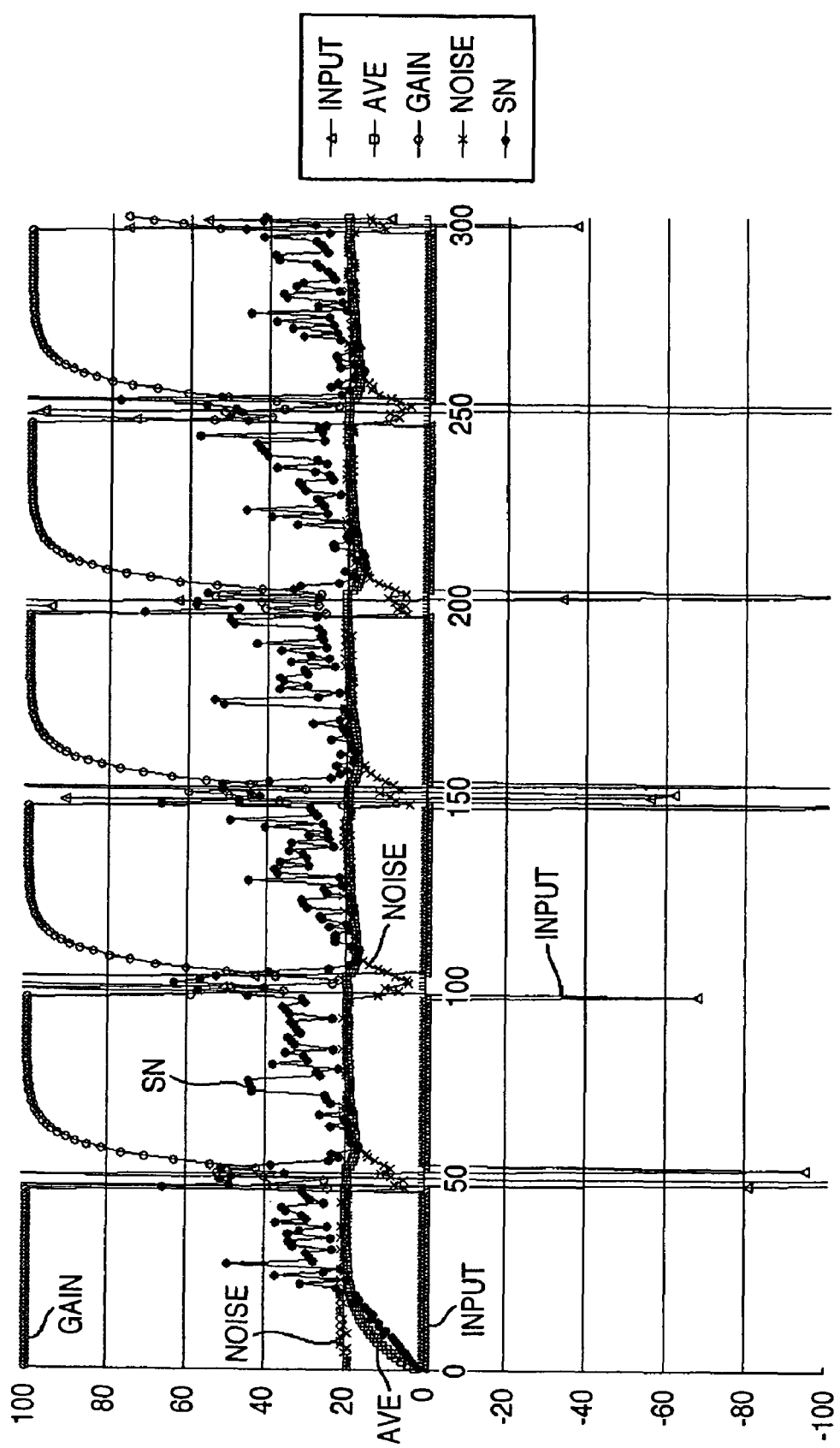
FIG. 12 shows a simulation result to explain the processing in the first embodiment.

FIG. 12 shows a noise removal state when an input signal of ±500 is input for five frames every 50 frames. As a parameter not shown in FIGS. 11 and 12, the ratio between the input signal and error, i.e., an SN on the auditory sense, is plotted. As can be seen from FIG. 12, except for the initial extraction, an SN of about 20 dB can be assured even immediately after a large input signal disappears.

Figure 13:
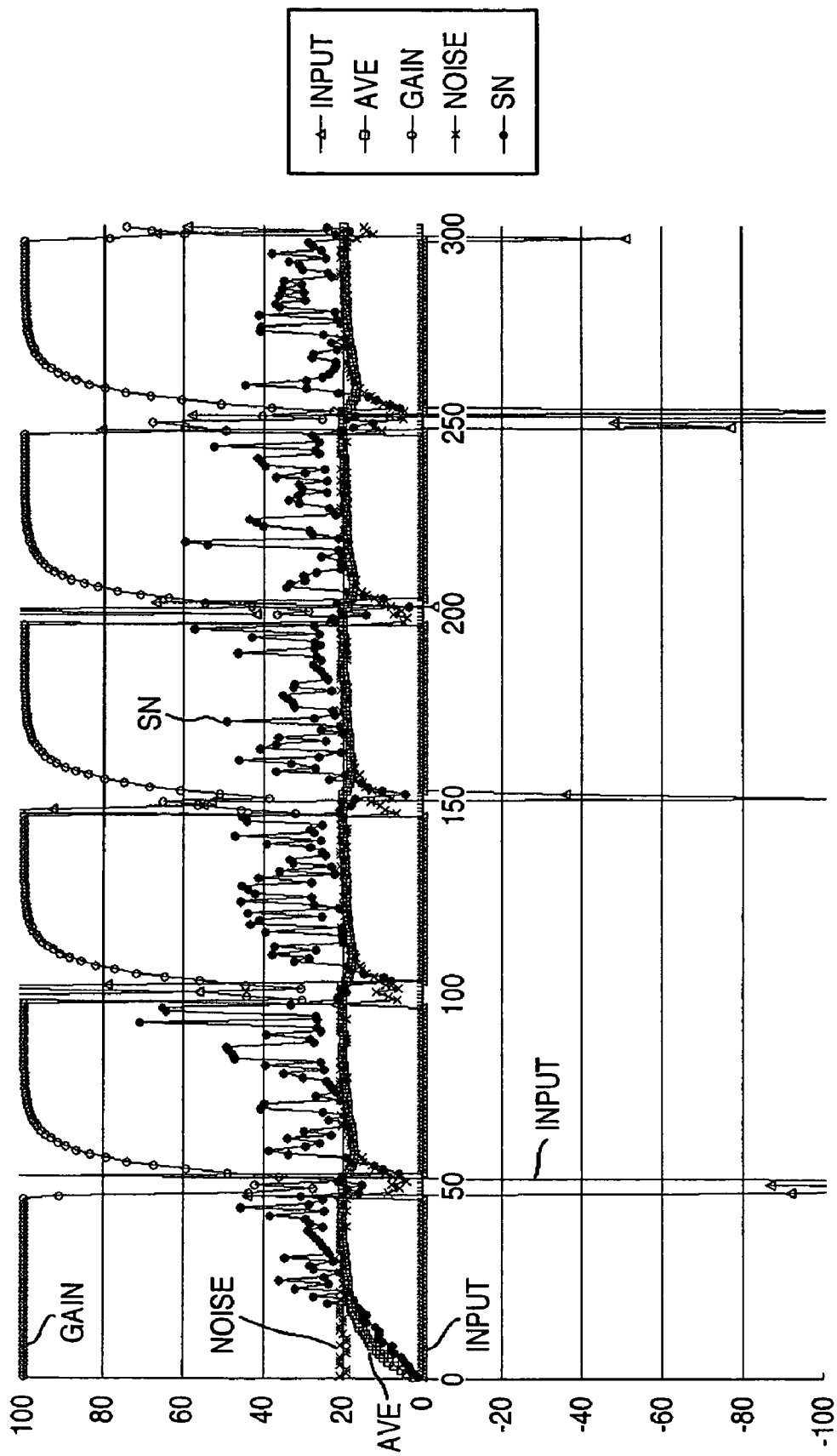
FIG. 13 shows a simulation result to explain the processing in the first embodiment.

On the other hand, FIG. 13 shows a case wherein the level adjusting unit 27 is omitted. As can be seen from FIG. 13, the SN immediately after a large input signal disappears is 10 dB or less, a period in which the SN deteriorates continues several frames, and noise is disturbing.

Second Embodiment

The second embodiment according to the present invention will be described below.

The overall block diagram is substantially the same as in FIG. 1 in the first embodiment. A difference lies in that the ALC unit 10 automatically performs level control in FIG. 1, while gain controllers which are independent for respective channels and are manually operated by the operator are equipped in the second embodiment.

Figure 9:
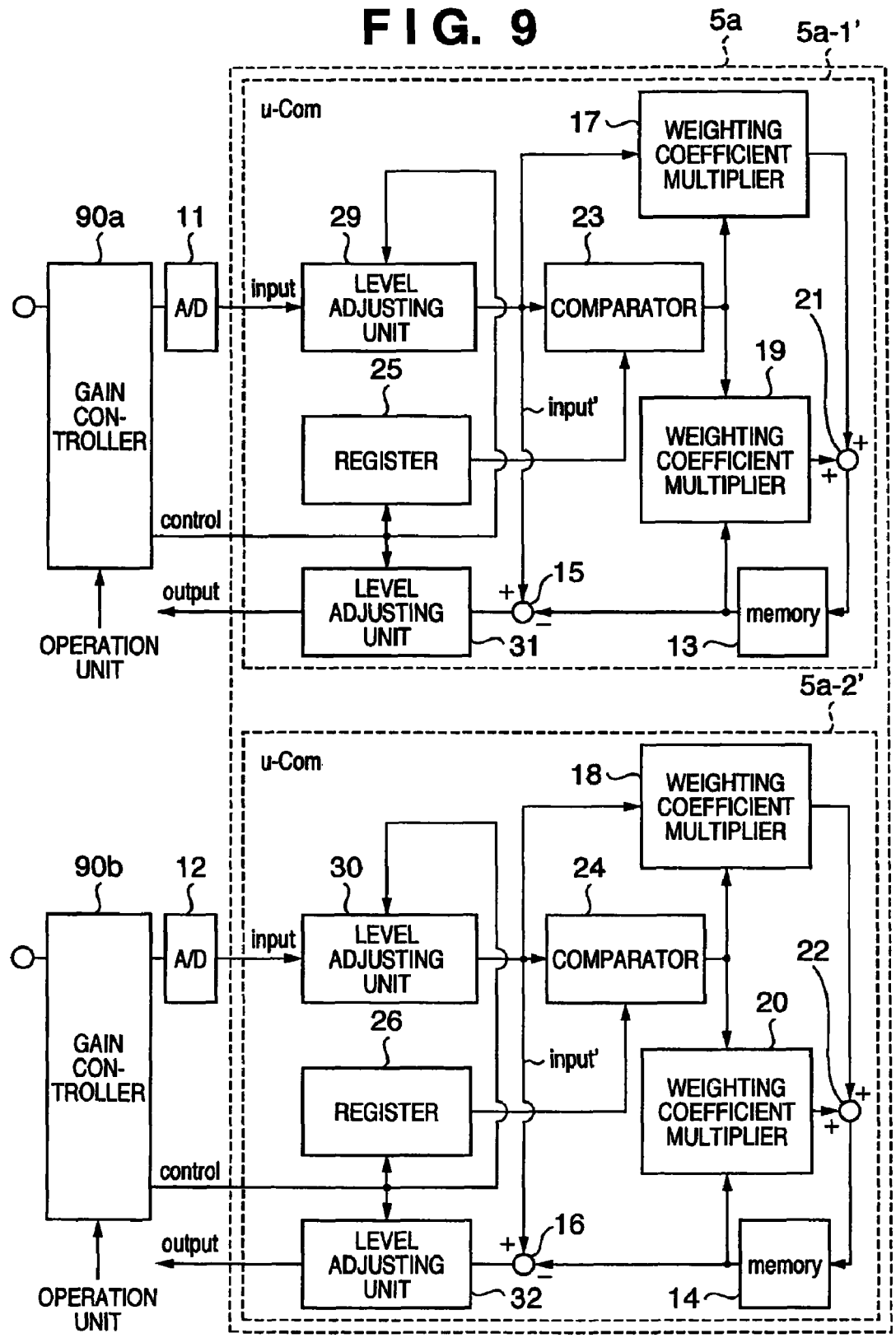
FIG. 9 is a block diagram showing the arrangement of a data calculation processing unit in the second embodiment.

FIG. 9 is a block diagram showing the data calculation processing unit 5a and its neighboring units in the second embodiment.

Gain controllers 90a and 90b respectively set gains according to an instruction from an operation unit (not shown) of the camera. Note that the arrangements and operations of circuits 5a-1' and 5a-2' of the left and right channels in FIG. 9 are the same, and a description for only one channel will be given.

When data from the A/D converter 11 is input at a cycle of sampling clocks, a level adjusting unit 29 adjusts the level of input data INPUT in accordance with a gain value from the gain controller 90a.

The register 25 determines thresholds according to the gain value from the gain controller 90a as in the first embodiment. The comparator 23 checks if adjusted input data INPUT' falls within a range specified by the thresholds, and determines the weighting coefficient k (0<k<1). The comparator 23 outputs the determined weighting coefficient k to the weighting coefficient multiplier 17, and "1−k" to the weighting coefficient multiplier 19.

The weighting coefficient multiplier 17 multiplies the data INPUT' by the weighting coefficient k, and outputs the product to the adder 21.

On the other hand, the weighting coefficient multiplier 19 reads out data which is synchronized with the position of the input data INPUT' in the frame from the memory 13, and multiplies that data (AVE) by "1−k", thus outputting the product to the adder 21.

The adder 21 adds the data from the weighting coefficient multipliers 17 and 19 and writes the sum in the memory 13, thus updating the contents of the memory 13. At the same time, the adder 15 adds the data read out from the memory 13 to the data INPUT' as a negative value, thus removing noise.

After that, a level adjusting unit 31 adjusts data from the adder 15, and outputs the result. The arrangement of FIG. 9 has been explained. To allow better understanding, the following explanation will be given.

The level adjusting device 29 adjusts input data INPUT to cancel a change in gain of the gain controller 90*a* even if it takes place. That is, in the processing after the output of the level adjusting unit 29, the operation is done in the same manner as in noise removal at a fixed gain. However, this cannot attain a gain that the operator intended, and the level adjusting unit 31 at the output stage adjusts data to the level intended originally and outputs the adjusted data.

More specifically, let G3 be the gain of the gain controller 90*a*. Then, a gain G4 of the level adjusting unit 29 is determined as:

$$G4=1/G3$$

Note that the level-adjusted data INPUT' is input to the comparator 23, and is compared with the thresholds supplied from the register 25. The register 25 generates thresholds according to the gain G3 of the gain controller 90*a* as in the level adjusting unit 29.

For example, when G3=1, a threshold thresh to be generated is given by:

$$thresh=(20\pm10)\times G3$$

The comparator 23 checks if the data INPUT' satisfies:

$$10\times G3 \leq INPUT' \leq 30\times G3 \quad (4)$$

In the above checking processing, if the gain of the gain controller 90*a* is "1" as a maximum value, the operation of the comparator 23 amounts to checking if the data INPUT' satisfies:

$$10 \leq \text{absolute value of INPUT'} \leq 30$$

If the gain of the gain controller 90*a* becomes "0.5", the comparator 23 checks if the data INPUT' satisfies:

$$5 \leq \text{absolute value of INPUT'} \leq 15$$

In any case, if inequality (4) is satisfied, the comparator 23 outputs the weighting coefficient k(=0.1) to the weighting coefficient multiplier 17 and "1−k" (=0.9) to the weighting coefficient multiplier 19. If it is determined that inequality (4) is not satisfied, the comparator 23 outputs the smaller weighting coefficient k (=0.001) to the weighting coefficient multiplier 17 and "1−k" (=0.999) to the weighting coefficient multiplier 19.

The level adjusting unit 31 adjusts output data from the adder 15 in accordance with the gain of the gain controller 90*a*. Let G3 be the gain of the gain controller 90*a*, and G5 be the gain of the level adjusting unit 31. Then, G5=G3.

Note that the above case is merely an example. That is, the gain G4 of the level adjusting unit 29 and the gain G5 of the level adjusting unit 31 need only satisfy G5=G3×G4.

Figure 14:
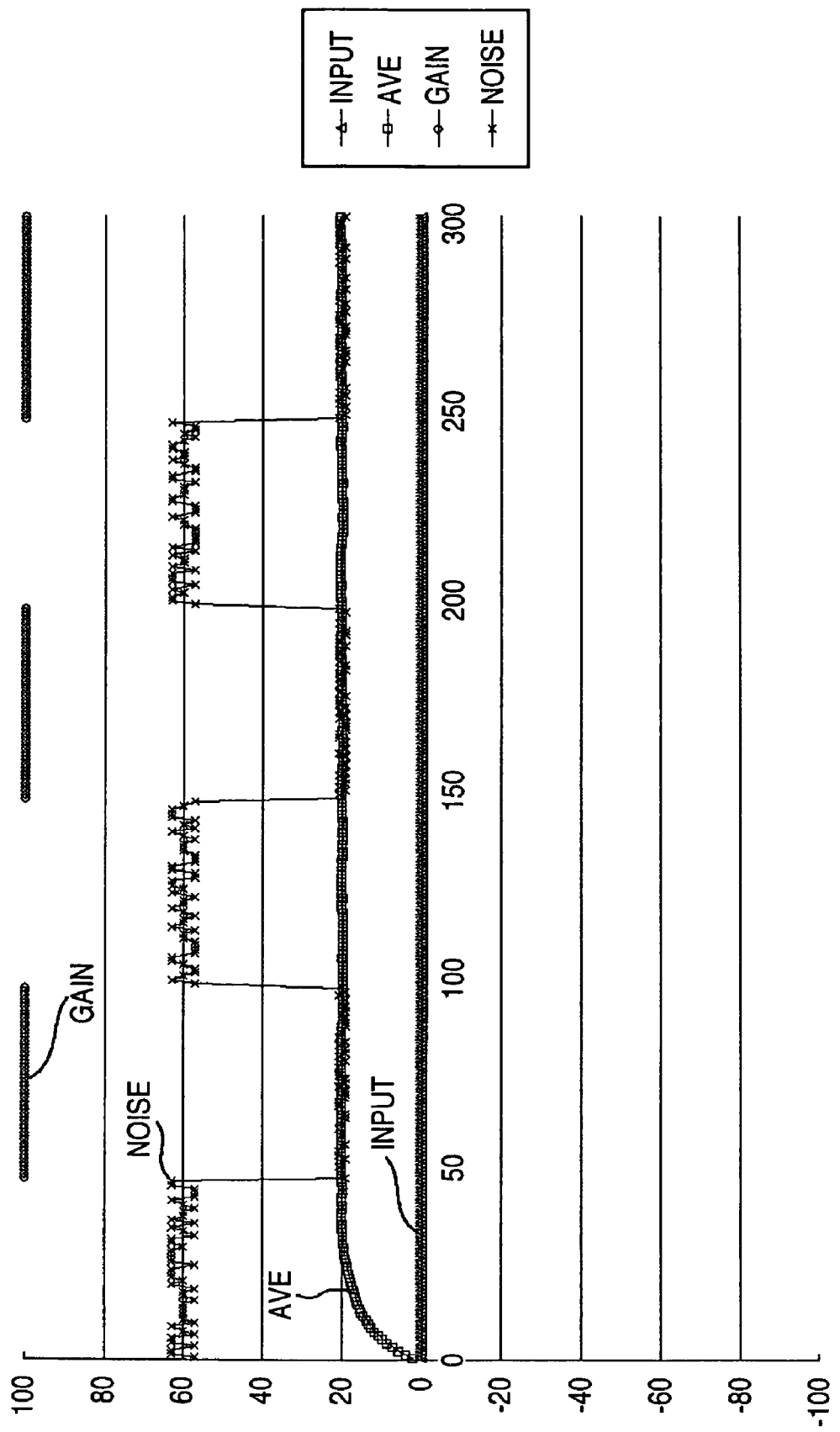
FIG. 14 shows a simulation result to explain the processing in the second embodiment.

FIG. 14 shows an example of simulation about the input signal INPUT, noise NOISE, value AVE of the memory 13, and the gain GAIN of the ALC unit 10 in the second embodiment.

In FIG. 14, the abscissa plots the number of frames, and the ordinate plots the data value. In this example, noise data at in-phase times in a frame are varied with a small width at arbitrary sampling times. More specifically, noise data values ranging from 19 to 21 are randomly set for each frame, the gain G3 of the gain controller 90*a* is set to "3" in sections of frames 0 to 50, 151 to 200, and 251 to 300, the gain G3 of the gain controller 90*a* is set to "1" in sections of frames 51 to 100, 101 to 150, and 201 to 250, and a microphone input signal is set to zero. Note that GAIN when the gain G3=3 falls outside the scale shown in FIG. 14. The register 25 generates thresholds thresh=20±10 when the gain G3 of the gain controller G3 is "1". When data INPUT' falls within the range specified by these thresholds, the weighting coefficient k determined by the comparator 23 is "0.1"; otherwise, it is "0.001".

As can be seen from FIG. 14, noise extraction starts from the beginning, and since the gain G3 of the gain controller 90*a* is "3" until the 50th frame, the noise level assumes a value three times the set value, and is located around 60. However, the central value of the average values ave is around 20. This is because, as described above, the adjustment value G4 of the level adjusting unit 29 is given by:

$$G4=1/G3=1/3$$

On the other hand, the positive input terminal of the adder 15 receives the output signal from the level adjusting unit 29, and its negative input terminal receives the output signal of the memory 13. The output signal from the level adjusting unit 29 is around 20 since the input signal around 60 is multiplied by G4, and the value of the memory 13 is around 20. Hence, a noise amount error included in the output of the adder 15 becomes around zero as it is simulated.

From the 51st frame, the gain G3 of the gain controller 90*a* becomes "1", and the noise level becomes around 20 as the setting value. The average value ave remains the same as the value before the 50th frame, i.e., a value around 20, since the adjustment value G4 of the level adjusting unit 29 is given by:

$$G4=1/G3=1$$

Therefore, the noise amount error included in the output of the adder 15 becomes almost zero as in the above case.

Figure 15:
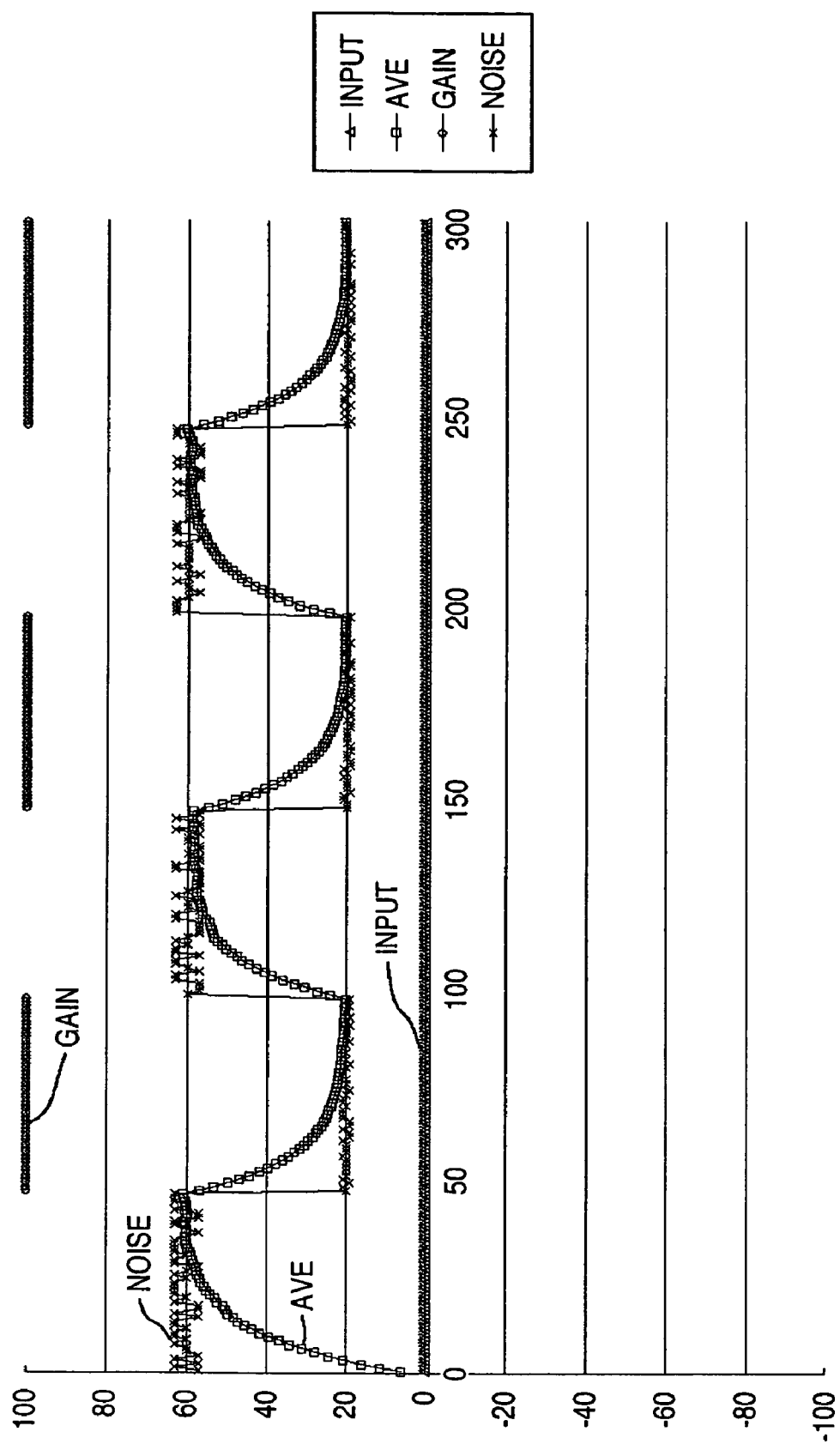
FIG. 15 shows a simulation result to explain the processing in the second embodiment.

FIG. 15 shows a simulation if the level adjusting unit 29 is omitted. As can be seen from FIG. 15, the noise level becomes around 60 three times the setting value due to the gain G3 of the gain controller 90*a*, and the average value ave becomes closer to around 60. As a result, the noise amount error included in the output of the adder 15 converges toward zero.

However, since the gain G3 of the gain controller 90*a* becomes "1" at the 51st frame, the level of data INPUT' to be supplied to the positive input terminal of the adder 15 decreases to around 20 at once, but the value held in the memory 13 is still around 60, thus generating their difference. Likewise, a reverse phenomenon takes place at the 100th frame, and every time the gain of the gain controller changes, an error output becomes large for several ten frames from the change point. That is, this means that noise is produced.

Figure 16:
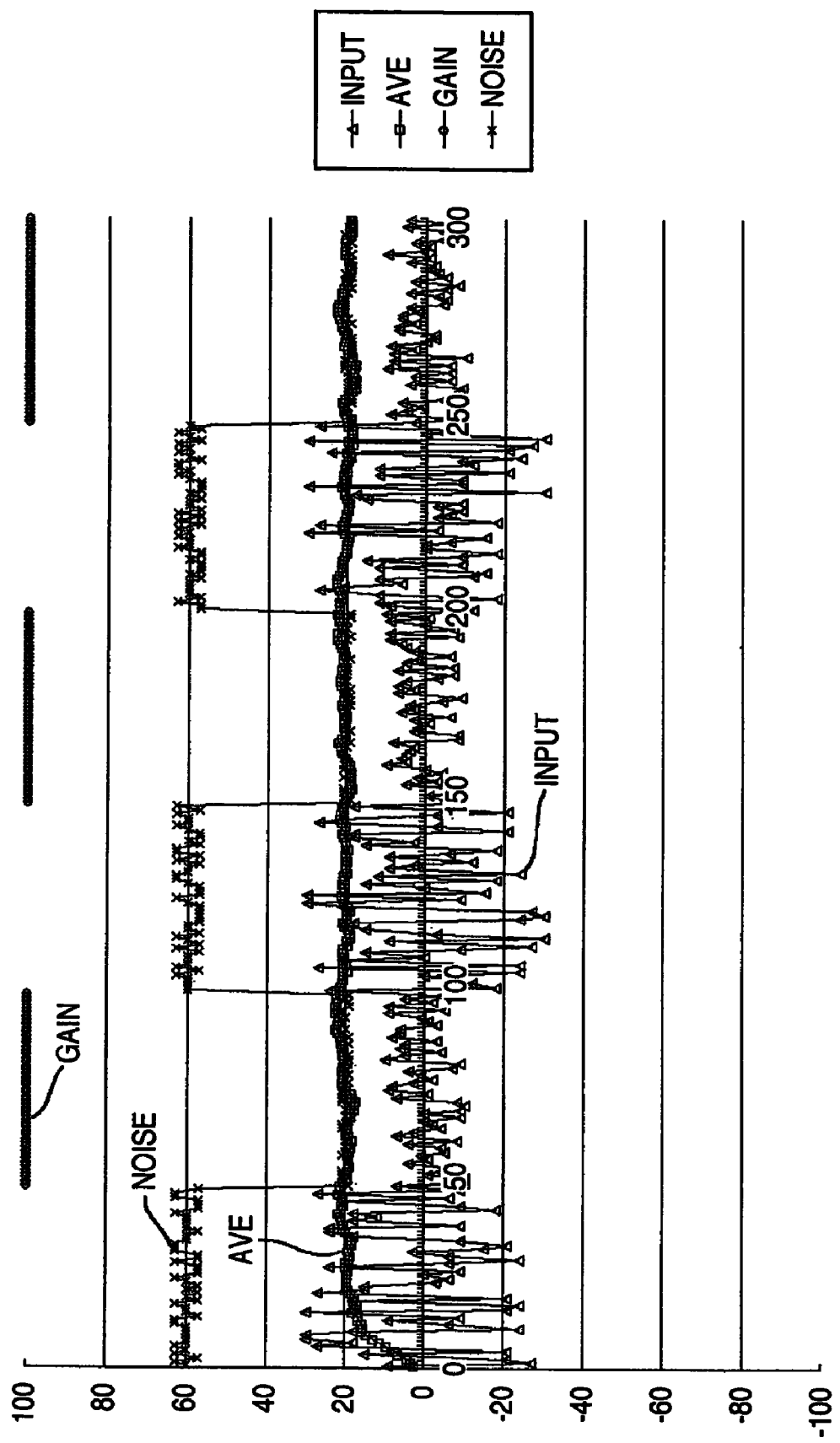
FIG. 16 shows a simulation result to explain the processing in the second embodiment.

FIG. 16 shows an operation example of the second embodiment, and the operation example will be described below. FIG. 16 shows a simulation when the input signal is a random signal of ±10 under the condition that noise and the input signal are input together.

Referring to FIG. 16, the amplitude level of the input signal changes in synchronism with a change in gain of the gain controller 90*a*. Likewise, the final output level must also change according to the gain of the gain controller 90*a*. The output of the adder 15 changes to a level effective to attain noise removal and is different from an original signal, i.e., the level of the output signal from the gain controller 90*a*. However, the output of the adder 15 should be finally output according to the gain controller 90*a*, and the level adjusting unit 31 is provided to restore its level.

As described above, since the gain G5 of the level adjusting unit 31 is equal to the gain G3 of the gain controller 90*a*, the level of data after noise is removed by the adder 15 is restored to the signal level that the operator intended.

Since these processes use digital data converted by the A/D converter 11, even when complicated data processing is done, noise attachment, distortion, and the like remain unchanged.

A theoretical attenuation amount of this system is determined depending on the rotation precision of the rotary drum 2 and the change width of the produced noise level. Assume that the precision in which rotation nonuniformity changes phase within the range of 5° at the highest frequency of a noise component to be reduced is set with respect to that highest frequency, and the change width is 2 dB with respect to the aforementioned average value. FIG. 7 shows the attenuation amount when two signals having different phases and levels are subtracted. Under the aforementioned conditions, since the noise level is attenuated 15 dB or more from FIG. 7, a sufficient effect can be obtained.

As described above, according to the first embodiment, even when periodic mechanical noise generated by the apparatus is superposed on an electrical signal obtained via each microphone, since data that cancels the mechanical noise is stored in the memories 13 and 14, the noise can be efficiently removed. As for updating of the memories 13 and 14, when the input signal level is relatively small, a large weighting coefficient k is generated, and the memories 13 and 14 can quickly hold data approximate to noise data. Conversely, if the input signal level is large, since a small weighting coefficient is generated, data stored in the memories 13 and 14 can be kept while reducing any changes. Since data from each memory is adjusted according to the gain of the ALC unit 10, a signal that can remove noise nearly equal to the noise level of the current input can be generated.

According to the second embodiment, even when the gain control that controls the input signal level is manually done, constant noise data can be stored and held according to the value of the gain control. Even when the gain of the gain control changes abruptly, the level of the noise signal to be removed can be set appropriately within such a transient period.

In the above embodiments, as noise of a mechanical noise source, noise produced when each head mounted on a drum that records on a magnetic tape comes in contact with and separates from the tape, and electromagnetic noise generated upon rotation of capstan rollers have been exemplified. However, the present invention is not limited to these specific noise components. That is, the present invention can be applied to any other periodic mechanical noise components which mix in the microphone.

As described above, according to the embodiment of the present invention, when noise produced by operation of, e.g., a rotary drum or the like of the recording/playback apparatus, which makes a periodic operation mixes in a microphone, a noise waveform can be extracted, and noise can be reduced.

Also, the waveforms of noise components produced by operation units with periodicity such as rotation of a rotary drum, a capstan motor used to feed a tape, and the like of the recording/playback apparatus can be extracted for respective independent cycles, and an apparatus with a higher noise reduction effect can be provided.

Furthermore, even when the levels and tones of noise components that mix in a microphone vary depending on devices, they need not be individually adjusted. Also, even when noise components change over time, noise unique to a device can be coped with by the same means and the same processing.

Unlike in the prior art, audio components to be originally recorded can be prevented from being removed by a filter, and only unwanted noise waveforms are extracted. Hence, noise can be reduced without any sound quality drop.

As described above, according to the present invention, mechanical noise from a pre-identified noise source on the device side can be removed, while tracing a change in gain of acoustic wave data and a change over time of the noise source can be traced.

As many apparently widely different embodiments of the present invention can be made without departing from the spirit and scope thereof, it is to be understood that the invention is not limited to the specific embodiments thereof except as defined in the claims.

This application claims the benefit of Japanese Patent Application No. 2005-029826 filed on Feb. 4, 2005, which is hereby incorporated by reference herein its entirety.

What is claimed is:

1. An apparatus which reduces a noise, wherein the noise has a known cycle and is included in acoustic data, comprising:
a gathering unit which gathers, in series, signals of acoustic data;
a gain adjusting unit which adjusts a gain of signals of acoustic data gathered by the gathering unit;
a storage unit which is constructed to store the signals of acoustic data for at least one cycle of the noise;
a first adjusting unit which re-adjusts a gain of the acoustic data obtained by the gain adjusting unit in accordance with a gain of the gain adjusting unit, and generates acoustic data of a substantially constant gain;
an updating unit which (i) multiplies the acoustic data gathered by the gathering unit by a first weighted coefficient, (ii) multiplies in phase acoustic data stored in the storage unit by a second weighted coefficient, (iii) adds the two multiplication results, and (iv) updates the acoustic data stored in the storage unit with the added result;
a subtraction unit which subtracts the data stored in the storage unit from the acoustic data obtained by the first adjusting unit; and
a second adjusting unit which re-adjusts a gain of the acoustic data obtained by the subtraction unit to the gain of the gain adjusting unit, and outputs the re-adjusted acoustic data as acoustic data after noise removal.

2. The apparatus according to claim 1, wherein for k1 (0<k1 <1) as the first weighting coefficient in the updating unit, and for k2 as the second weighting coefficient, the first weighting coefficient and the second weighting coefficient satisfy:

k2=1−k1.

3. The apparatus according to claim 2, wherein for k1 as the first weighting coefficient when an absolute value of the acoustic data obtained by the gain adjusting unit exceeds a predetermined threshold, and for k1' as a weighting coefficient when the absolute value of the acoustic data is not more than the predetermined value, the two weighting coefficients satisfy:

k1<k1'.

4. The apparatus according to claim 3, wherein the predetermined threshold changes depending on the gain of the gain adjusting unit.

5. The apparatus according to claim 1, further comprising a noise source which includes a convey unit of a magnetic tape used to store and play back acoustic data, and a rotation drive unit of a recording drum head used to record acoustic data on the magnetic tape.

6. A method of controlling an apparatus for reducing a noise, wherein the noise has a known cycle and is included in acoustic data, wherein the apparatus comprises a gathering unit which gathers, in series, signals of acoustic data, and a storage unit which is constructed to store the signals of acoustic data for at least one cycle of the noise, the method comprising:

- a gathering step of the gathering unit gathering, in series, signals of acoustic data;
- a gain adjusting step of adjusting a gain of signals of acoustic data gathered by the gathering unit;
- a first adjusting step of re-adjusting a gain of the acoustic data obtained in the gain adjusting step in accordance with a gain from the gain adjusting step, to generate acoustic data of a substantially constant gain;
- an updating step of (i) multiplying the acoustic data gathered in the gathering step by a first weighted coefficient, (ii) multiplying in phase acoustic data stored in the storage unit by a second weighted coefficient, (iii) adding the two multiplication results, and (iv) updating the acoustic data stored in the storage unit with the added result;
- a subtraction step of subtracting the data stored in the storage unit from the acoustic data obtained in the first adjusting step; and
- a second adjusting step of re-adjusting a gain of the acoustic data obtained in the subtraction step to the gain from the gain adjusting step, and outputting the re-adjusted acoustic data as acoustic data after noise removal.

7. An apparatus which reduces a noise, wherein the noise has a known cycle and is included in acoustic data, comprising:

- a gathering unit which gathers, in series, signals of acoustic data;
- a gain adjusting unit which adjusts a gain of signals of acoustic data gathered by the gathering unit;
- a storage unit which is constructed to store the signals of acoustic data for at least one cycle of the noise;
- a first adjusting unit which re-adjusts the acoustic data obtained by the gain adjusting unit in accordance with a gain of the gain adjusting unit, and generates acoustic data of a substantially constant gain;
- a setting unit which sets a threshold;
- a comparing unit which compares, in series, the signals of the acoustic data gathered by the gathering unit with the threshold set by the setting unit;
- a calculating unit which calculates a weighted average of the acoustic data for a phase in the cycle, in accordance with the result of the comparison by the comparing unit;
- a subtracting unit which subtracts the weighted average from the acoustic data for the phase; and
- a second adjusting unit which re-adjusts a gain of the acoustic data obtained by the subtraction unit to the gain of the gain adjusting unit, and outputs the re-adjusted acoustic data as acoustic data after noise removal.

8. A method of controlling an apparatus for reducing a noise, wherein the noise has a known cycle and is included in acoustic data, wherein the apparatus comprises a gathering unit which gathers, in series, signals of acoustic data, and a storage unit which can store the signals of acoustic data for at least one cycle of the noise, the method comprising:

- a gathering step of the gathering unit gathering, in series, signals of acoustic data;
- a gain adjusting step of adjusting a gain of signals of acoustic data gathered by the gathering unit;
- a first adjusting step of re-adjusting a gain of the acoustic data obtained in the gain adjusting step in accordance with a gain from the gain adjusting step, to generate acoustic data of a substantially constant gain;
- a setting step of setting a threshold;
- a comparing step of comparing, in series, the signals of the acoustic data gathered in the gathering step with the threshold set in the setting step;
- a calculating step of calculating a weighted average of the acoustic data for a phase in the cycle, in accordance with the result of the comparison in the comparing step;
- a subtracting step of subtracting the weighted average from the acoustic data for the phase; and
- a second adjusting step of re-adjusting a gain of the acoustic data obtained in the subtraction step to the gain from the gain adjusting step, and outputting the re-adjusted acoustic data as acoustic data after noise removal.

* * * * *